Dec. 26, 1939.  L. H. HILL  2,185,105
ELECTRICAL APPARATUS
Original Filed Aug. 15, 1932  4 Sheets-Sheet 2

Inventor
L. H. Hill
by G. J. DeWein
Attorney

Dec. 26, 1939.　　　　　L. H. HILL　　　　2,185,105
ELECTRICAL APPARATUS
Original Filed Aug. 15, 1932　　4 Sheets-Sheet 3

Fig. 6

Inventor
L. H. Hill
by G. J. DeWein
Attorney

Dec. 26, 1939.  L. H. HILL  2,185,105
ELECTRICAL APPARATUS
Original Filed Aug. 15, 1932  4 Sheets-Sheet 4

Inventor
L. H. Hill
by G. J. Osbin
Attorney

Patented Dec. 26, 1939

2,185,105

UNITED STATES PATENT OFFICE 2,185,105

ELECTRICAL APPARATUS

Leland H. Hill, Wauwatosa, Wis., assignor to Allis-Chalmers Manufacturing Company, Milwaukee, Wis., a corporation of Delaware Application August 15, 1932, Serial No. 628,876
Renewed August 29, 1938

26 Claims. (Cl. 175—30)

This invention relates in general to electrical protective apparatus, and more particularly to protective devices having a bushing, a lightning arrester, a fuse, and a fuse cut-out switch variously combined for use in connection with electrical apparatus such as transformers, reactors, circuit breakers and the like.

The utility of the present invention is best understood by referring first to a typical distribution transformer installation in which the high tension line wires are connectible to and disconnectible from the line terminals of transformer bushings by means of fuse cut-out switches which are usually mounted on a cross-arm. In such an installation it is usual practice to also mount lightning arresters on the cross-arm and to connect the same between the high tension line wires and ground. In installing such an installation it is necessary for the workmen to climb the pole and mount two fuse cut-out switches and one or more lightning arresters on the ends of a cross-arm and to make numerous connections between the various separate pieces of apparatus. In making an installation using apparatus embodying the present invention substantially all of the above described hazardous and expensive operations are obviated by reason of the fact that fuse cut-out switches and lightning arresters of improved construction are combined with the transformer bushings to constitute a unitary article of manufacture with substantially all electrical connections made at the factory.

An object of the invention is to provide a unitary article of manufacture comprising an insulating bushing, a lightning arrester and a fuse cut-out switch.

Another object of this invention is to provide a novel manually operable switch mechanism which is adapted to be carried by the bushing of electrical apparatus and is operable to connect or disconnect the electrical apparatus to and from the line by inserting or removing a fuse in the circuit to said apparatus.

Another object of this invention is to provide a protective device for electrical apparatus comprising a manually operable switch mechanism and a lightning arrester incorporated in the device.

Another object of the invention is to provide a combined lightning arrester and fused cut-out having a novel manually operable switch mechanism for connecting and disconnecting a fusible member between the terminals carried by the casing of the arrester.

Another object of the invention is to provide an insulating bushing which has a lightning arrester mounted therein and also has a manually operable switch mechanism carried by the bushing for connecting and disconnecting the electrical apparatus fed through the bushing.

A further object of the invention is to provide an improved bushing assembly having a novel form of lightning arrester mounted within the bushing and electrically connected to a terminal of the bushing.

A still further object of the invention is to provide a disconnect switch mechanism arranged within a bushing assembly and having provision for assuring that the operator's hand will be in a safe position when the switch mechanism is moved by hand to close the circuit including the line and lead terminal of the bushing.

These and other objects and advantages are attained by this invention, various novel features of which will be apparent from the description and drawings herein, and will be more particularly pointed out in the claims.

Various illustrative examples of the application of this invention are shown in the accompanying drawings in which.

Figures 1, 2:
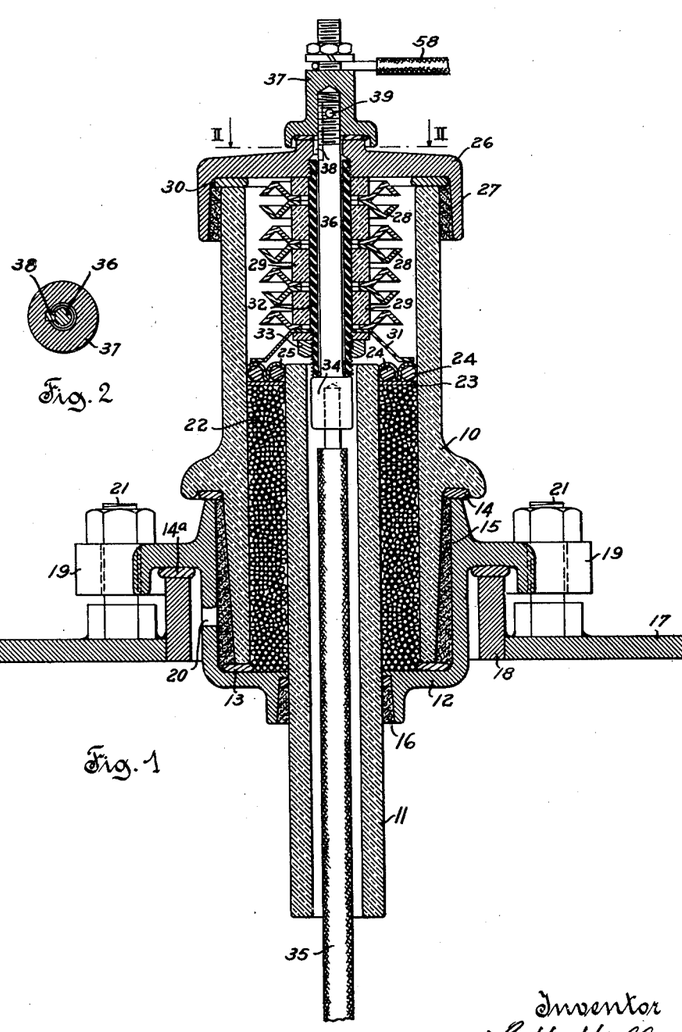
Fig. 1 is a sectional view of a combined lightning arrester and insulating bushing embodying the invention.
Fig. 2 is a sectional view of the terminal cap construction taken on line II—II of Fig. 1.

Referring now to Fig. 1, 10 is an insulating shell, preferably of porcelain, and 11 is an insulating tube, also preferably of porcelain, which is held in nesting relation to shell 10 by means of a metal supporting sleeve 12 and gaskets 13 and 14. Shell member 10 is suitably attached to sleeve member 12, preferably by means of bushing cement 15 which is poured into the space between shell member 10 and sleeve member 12 through hole 20. Tube member 11 is attached to supporting sleeve 12 in any suitable manner, such as by means of bushing cement 16. The casing member 17 of a transformer, reactor or the like is provided with an annular sleeve member 18 which is attached thereto. Supporting sleeve 12 is provided with a plurality of clamping lugs 19 spaced around its periphery. A plurality of clamping bolts having their head portions welded to casing 17 are arranged to pass through the forked portion of lugs 19 for the purpose of clamping supporting sleeve 12 to the sleeve member 18 of the casing, between which a suitable gasket 14a may be interposed. Although Fig. 1 shows a combined bushing and lightning arrester mounted vertically on a casing or partition member, it is to be understood that the device will operate equally as well when mounted in any other desired position. It is also to be understood that the mounting means shown in Figs. 3, 4, 6, 7 and 8 may be used instead of the mounting means shown in Fig. 1.

The annular chamber formed by shell 10 and tube 11 contains any suitable granular or solid lightning arrester material such as materials comprising carborundum or oxide of lead. An annular contact ring 23, a pair of packing rings 24 and a crimped ring 25 serve to retain the lightning arrester material 22 in place and to exclude moisture therefrom, noting that annular spring contact 31 maintains contact with member 25.

A cap member 26 is attached to shell member 10 with a suitable gasket 30 therebetween by any suitable means, such as bushing cement 27. A plurality of spark gap elements 28, insulating spacers 29 and an annular contact spring 31 are held in assembled relation by means of a tube 32 of insulating material which is attached to cap member 26 and is provided with a nut member 33 which serves to tighten the spark gap assembly.

A lead terminal 34 is provided with suitable connecting means for lead conductor 35 which is connected to the electrical apparatus (not shown) within casing 17. A conductor rod 36 is attached to lead terminal 34 and extends through tube member 32 and normally extends through a hole in cap member 26. A line terminal member 37 is screwed onto the threaded portion of conductor rod 36 which is prevented from turning by means of a key 38, mounted in cap member 26 and a keyway in conductor rod 36, noting Fig. 2. Line conductor 58 is suitably attached to line terminal 37.

The combined lightning arrester and bushing above described may be removed from supporting member 17 by unscrewing terminal cap 37 and the nuts on bolts 21 and lifting out the unit, leaving conductor rod 36 attached to lead conductor 35. A new unit may be substituted by passing a cord through the axial aperture in the unit, tying this cord through the hole 39 in conductor rod 36 and slipping the new unit over conductor rod 36 and lead conductor 35 so that shell member 10 rests upon gasket 14. Conductor rod 36 may then be fished through the hole in cover cap 26 and the line terminal 37 may then be screwed on conductor rod 36.

The operation of the above described apparatus is as follows: Upon occurrence of an excessive voltage upon terminal member 37 relative to ground due to lightning or other disturbances, the dielectric between spark gaps 28 will break down thereby permitting current to flow from line terminal 37 through the lightning arrester material 22, through conductive supporting sleeve 12 to casing 17 which is suitably grounded. Lightning arrester material 22 serves to limit the flow of current and, if carborundum is used, produces a unidirectional valve action which assists in interrupting the flow of current and establishing normal conditions. The above described apparatus also serves as an insulating bushing inasmuch as current is conducted to and from line terminal conductor 37 through conductor rod 36, lead terminal 34 and lead conductor 35 to and from the electrical apparatus connected to lead conductor 35, noting that member 17 may be a partition member in any known type of eletrical station or electrical apparatus.

As shown in Fig. 1, the material 22 is continuously conductively connected to the casing, that is, with the spark gaps 28 on the line side of the material rather than between the material and the casing. When this apparatus serves to conduct current from a line conductor through a casing aperture to apparatus in the casing, the placing of the spark gap on the line side of the material 22 permits better insulation than if the spark gap and resistor material were interchanged. In the construction shown in Fig. 1 the line voltage is normally at that end of the bushing away from the casing, whereas if the gaps 28 and the resistor 22 were interchanged, the static field of the bushing would be changed thereby lowering both the flash-over voltage of the bushing and increasing the possibility of puncture.

It is to be noted that the above described device is adapted to prevent ignition of the gases within the casing 17 due to an abnormal discharge through the lightning arrester or an explosion in the lightning arrester compartment. This protective feature is accomplished by virtue of the fact that contact spring 31 effectively seals the space within insulating tube 11 from the spark gap compartment, noting that no sparking will occur between elements 31, 25 and 23 due to the fact that they are continually in engagement. An explosion within the space filled by lighting arrester 22 is prevented from blowing flame into the casing 17 by reason of the fact that supporting sleeve 12, as well as bushing cement 15 forms a shield which is substantially unbreakable, noting that the possibility of breakage of tube 11 due to compressive forces is very remote.

Figure 3:
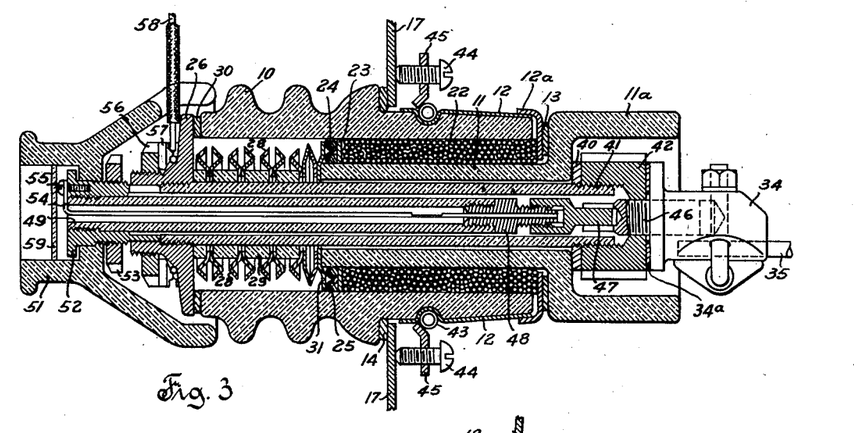
Fig. 3 is a sectional view of a combined insulating bushing, lightning arrester, fuse and cut-out switch embodying the invention.

Referring now to Fig. 3, 10 is an insulating shell, preferably of porcelain, and 11 is an insulating tube, also preferably of porcelain and having an offset portion 11a. Tube 11 is held in nesting relation relative to shell 10 by means of clamping structure which comprises cap member 26, insulating tube 41, preferably of fiber, and collar member 42, noting that tube 41 is screwed into cap member 26 and is put under tension by means of collar 42 which is screwed on to tube 41. A gasket 30 is interposed between collar 26 and shell 10 and another gasket 40 is interposed between collar 42 and the radially extending portion of offset tube 11. Gaskets 13—13 and ground contact ring 12a are interposed between shell 10 and the radially extending portion of tube 11.

A suitable lightning arrester material 22, such as material containing carborundum or an oxide of lead in solid or granular form, is arranged within the annular chamber defined by the walls of shell 10 and tube 11 and is in contact at one end with ground contact ring 12a and with contact ring 23 at its other end. The lightning arrester material 22 is sealed within the above described annular chamber by means of packing rings 24 which are biased by means of pressure distributing ring 25 and contact springs 31. A plurality of annular dished rings 26 surround insulating tube 41 and are held in spaced relation by means of insulating spacers 29 to form a series of spark gaps. The number of spark gaps and the amount of lightning arrester material may be varied to suit the various conditions met in practice in a manner known to those skilled in the art.

A lead terminal 34 of the well known solderless type is attached to collar member 42 by means of the threaded portion of stationary contact member 46. Lead conductor 35 from the electrical apparatus (not shown) is connected to lead terminal 34. Shell member 10 is attached to a partition or casing member 17 in any well known manner, noting Figs. 1, 4, 6, 7 and 8, and is for the sake of illustration shown as attached to member 17 by means of a clamping device comprising a coil spring 43 lying in an annular groove in shield member 12, and an annular clamping ring 45 which is biased against spring 43 by means of a plurality of screws 44 which are in contact with member 17. A suitable gasket such as 14 is interposed between a flanged portion of shell 10 and member 17. An annular reinforcing sleeve 12 surrounds a portion of shell member 10 for the purpose of preventing explosions from ejecting lightning arrester material and flame into the interior of casing 17.

Member 46 is provided with a contact portion having a plurality of resilient contact fingers adapted to engage plug contact 47. Plug contact 47 is screwed to a contact nipple 48 which in turn is screwed into the bore of a fuse carrier tube 49 of heat resistant insulating material such as fiber.

A handle member 51 is provided with an axial bore into which bushing contact 52 is mounted and held in position by means of a lock nut 53. A fuse wire 54 is provided at one end with a T-shaped head adapted to be clamped between contact nipple 48 and contact plug 47 and is attached at its other end to contact bushing 52 by means of a terminal screw 55. A portion of bushing 52 is preferably serrated to provide a plurality of resilient contact fingers which are adapted to engage the contact surface on cap member 26. Cap member 26 is provided with any suitable form of line terminal noting that the illustrated form of this terminal comprises lock nut 56 and a clamping washer 57 having interrupted annular raised portions cooperating with similar raised portions on cap member 26 to retain and clamp line conductor 58 therebetween. A disk 59 of insulating material is arranged within the annular recessed portion of handle 51 and serves to prevent the entrance of foreign material into the fuse chamber. Handle member 51 is provided with an axial slot in its hood portion through which line conductor 58 is adapted to pass. It is to be understood that a fuse carrier and handle assembly of the type shown in Figs. 4, 5, 7 and 8 may also be used in the above described device.

During normal conditions, the above described apparatus serves as an insulating lead-in bushing to conduct current from line conductor 58 through the contact portions of members 26 and 52, through fusible conductor 54, to plug contact 47, through stationary contact 46, to lead terminal 34 and to the apparatus connected thereto by means of lead conductor 35.

The above described apparatus may be used to interrupt the circuit between the line terminal and the lead terminal by pulling out handle member 51 thereby disengaging plug 47 from stationary contact 46 and disengaging contact bushing 52 from the contact portion of cap member 26. Upon occurrence of overload on the apparatus connected with conductor 35, fuse 54 will melt, noting that a reduced portion may be provided near member 48. The arc produced upon blowing of the fuse will have an expulsion effect which will force gases through the open end of tube 49 thereby extinguishing the arc. The gases evolved upon the blowing of fuse 54 will force insulating disk member 59 out of the recessing portion of handle 51 thereby giving a visual indication that the fuse has blown. A new fuse may be replaced by removing handle member 51 and the fuse carrier attached thereto and unscrewing plug contact 47 and terminal screw 55.

Upon occurrence of an excessive voltage upon line conductor 58 relative to ground due to lightning or other disturbances, the dielectric between the spark gaps 28 will break down thereby permitting current to flow from line conductor 58 through spark gaps 28, through resistance material 22, through ground contact ring 12a and reinforcing sleeve 12 to casing 17 which is connected with ground. Lightning arrester material 22 serves to limit the flow of current and, if a material containing carborundum is used, a valve action will be obtained which assists in interrupting the flow of current.

From the above description it will be seen that an explosion within the bushing or lightning arrester will not blow inwardly thus preventing ignition of the gases or oil within the casing 17.

Figures 4, 5:
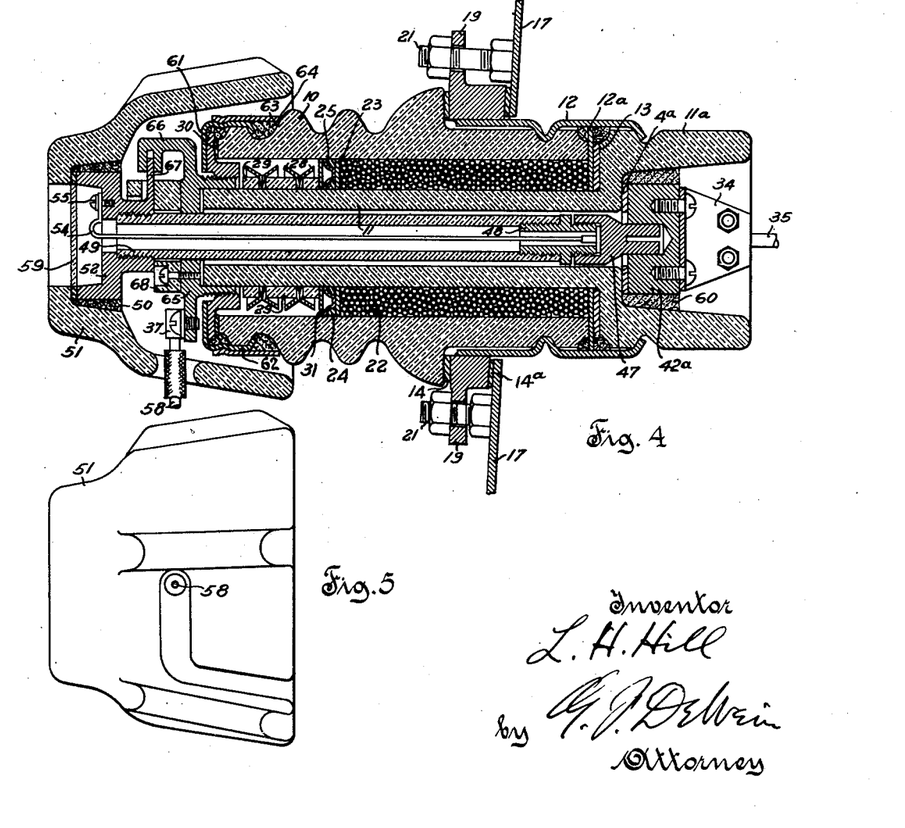
Fig. 4 is a sectional view of another form of a combined insulating bushing, lightning arrester, fuse and cut-out switch.
Fig. 5 is a side elevation view of the hood member shown in Fig. 4.

Fig. 4 shows a combined bushing, lightning arrester, and fused cut-out switch of substantially the same type as the device shown in Fig. 3. In Fig. 4 insulating tube 11 is held in nesting relation relative to insulating shell 10 by means of a clamping structure which comprises sleeve member 12 which is adapted to be crimped or rolled into annular groves formed in members 10 and 11. Collar member 42a is attached to tube 11 preferably by means of bushing cement 60 between the knurled outer surface of the collar and the inner surface of tube portion 11a which may be sanded. As indicated a moisture excluding gasket of any suitable material may preferably be interposed between the abutting surfaces of the tube 11 and the collar 42a. Sleeve member 12 originally has a cylindrical shape before it is pressed into the annular depressions in members 10 and 11, and a clamping ring 19 is attached thereto preferably by welding. A ground ring 12a and gasket 13 are interposed between shell member 10 and the radially extending portion 11a of tube 11, noting that bushing cement or any suitable sealing compound may be placed around the end of ground ring 12a to effectively seal the joint between members 10 and 11.

Cap member 61 is preferably attached to the left end of shell member 10 by means of a clamping ring 62 which is crimped or rolled into the position shown, after gasket 30 has been interposed between members 61 and 10. As an additional precaution to prevent the entrance of moisture, bushing cement 64 may be placed in the grooves shown in Fig. 4 and an auxiliary clamping ring 63 may then be crimped or rolled into place surrounding clamping ring 62. An annular guide member 65 is provided with an exteriorly threaded portion adapted to screw into the interiorly threaded portion of cap member 61. Member 65 is also provided with a stationary contact portion 66. Line terminal 37 is mounted on guide member 65 and is adapted to receive line conductor 58. A bushing member 52 is suitably attached to handle member 51, for example, by means of bushing cement 50. Member 52 is provided with a movable contact portion 67 which is adapted to be moved into engagement with stationary contact portion 66 when handle member 51 is rotated. One end of fiber insulating tube 49 is screwed into bushing member 52 and the other end thereof carries contact member 48 and plug contact 47. Fuse member 54 is attached in the fuse carrier in substantially the same way as described in connection with Fig. 3.

An insulating interlocking member 68 is suitably attached to guide member 65 and is provided with a bayonet slot therein adapted to receive movable contact portion 67. The hood portion of handle member 51 is also provided with a bayonet slot (see Fig. 5) adapted to receive line conductor 58. By reason of the bayonet slots in members 51 and 68, the fuse carrier may be inserted in the aperture in guide member 65 and pushed to the right so that plug contact 47 moves into engagement with stationary contact 46 and bushing member 52 moves into abutment with the ring portion of insulating member 68, however, contact 67 can not engage 66 until handle member 51 is rotated in a clockwise direction as viewed from the left. This feature necessitates that the operator must grip the ribbed portion of operating handle 51 in order to rotate the fuse carrier, and thereby reduces the possibility of injury should the operator have his hand over the end of the handle when switch contacts 66 and 67 are closed while a fault or overload condition exists in the apparatus connected to lead conductor 35. In order to renew the fuse member 54, it is necessary to first rotate handle member 51 in a counter-clockwise direction as viewed from the left and then remove the handle and fuse carrier by pulling the handle toward the left.

In Fig. 4 spark gap elements 28 of a somewhat different form are used and are separated by means of insulating spacers 29, noting that the spark gap assembly is loosely mounted on insulating tube 11 in order to compensate for expansion and contraction of the resistance material 22. The above described protective device may be attached to partition or casing member 17 by any known clamping means, and for the sake of illustration is shown as attached to member 17 by means of a clamping ring 19 which is preferably welded to shield member 12 with gasket 14 interposed therebetween. Ring 19 is provided with a plurality of circumferentially spaced lugs adapted to receive clamping bolts 21 which comprise studs screwed into nuts which are welded to member 17. The operation of the lightning arrester upon occurrence of excessive voltage due to lightning or other disturbances, is substantially the same as described in connection with Fig. 3.

Figure 6:
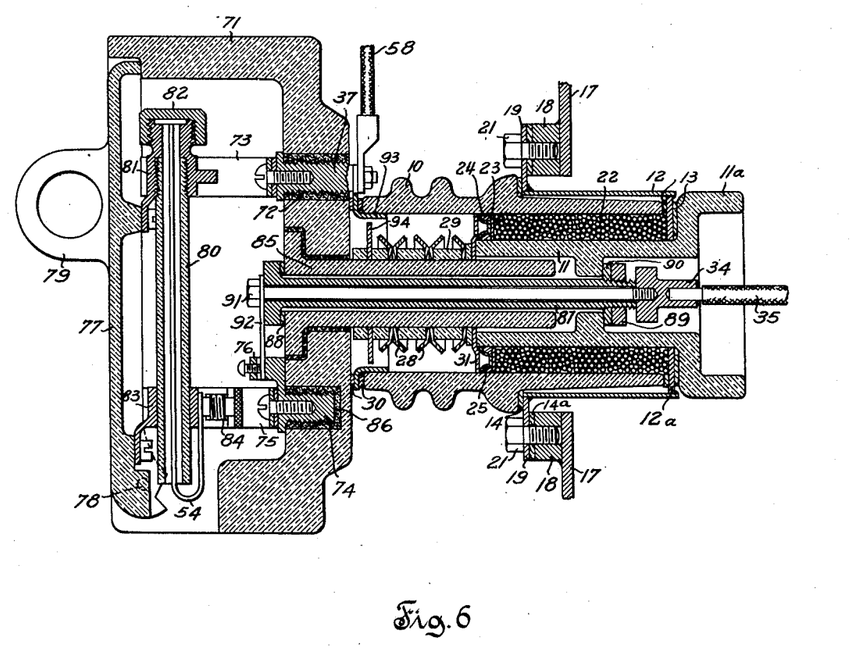
Fig. 6 is a sectional view of another form of combined insulating bushing, lightning arrester, fuse and cut-out switch.

Fig. 6 shows another form of combined bushing, lightning arrester, and a fused cut-out switch incorporating a number of features differing somewhat from the devices shown in Figs. 3 and 4. In Fig. 6, insulating tubes 11 and 85 and insulating shell 10 are held in nesting relation by means of a flange metal tube 87 which extends through tube 85 and is provided with a nut 89 which forces gasket 90 into engagement with the annular abutment portion of tube 11. Insulating tube 85 is attached to the casing member 71 by suitable means such as bushing cement 72. It is thus seen that the compressive forces set up by turning nut 89 puts gaskets 13, 30 and 88 under compression and holds the above described elements in proper spaced relation.

Cut-out casing 71 is provided with a pair of line contact clips 73 which are attached to line terminal member 37 which is cemented into the casing member 71 by means of bushing cement 72. A pair of lower contact clips 75 and a terminal member 76 are suitably attached to a tapped insert 74 which is similarly cemented into the casing member 71. Casing member 71 is also provided with a hinged cover member 77 which is detachably connected to the cover member by means of a hinge pin 78. An operating handle 79 is provided for opening and closing cover member 77. A fiber tube 80 is attached to cover member 77 by means of an upper fused contact 81 and a lower fuse contact 83. The upper fuse contact is provided with a knurled cap 82 adapted to hold the T-shaped end of fuse 54 in place and the lower fuse contact 83 is provided with a clamping screw 84 adapted to clamp the other end of fuse 54. Lead terminal 34 is preferably connected to terminal member 76 by means of a long bolt 91 which extends through tube 87 and a connecting link 92, however it is to be understood that this bolt may be omitted and lead terminal 34 could then be connected to clamping member 87 by any well known means.

The lightning arrester feature of Fig. 6 is substantially the same as that described in connection with Fig. 4 except that a line contact ring 93 is connected with line terminal 37 and extends a short distance inside shell member 10 in cooperative relationship with gap ring 94 in such a manner that the length of the gap between 93 and 94 is not changed upon occurrence of contraction or expansion of lightning arrester material 22. The lightning arrester material and the spark gaps are preferably serially connected between the line terminal 37 and the grounded supporting members 12 and 13 so that lightning and surge currents will not pass through the fuse, however, if it is desired to use the fuse cut-out switch to disconnect the lightning arrester from the line, the line conductor 58 may be connected to contact clip 75 or member 74 and link 92 then connected between bolt 91 and contact clip 73.

The above described apparatus is attached to partition member 17 or the casing wall of a transformer, reactor or the like by means of clamping bolts 21 which serve to attach annular clamping member 19 to sleeve member 18 with a suitable gasket interposed therebetween. Annular ring 19 is suitably attached to shell member 12 preferably by welding, noting that shell member 12 is also welded to ground contact ring 12a. It is to be understood that the clamping means shown in Figs. 1, 3, 4, 7 and 8 may be substituted for the above described clamping means. The space between shield member 12 and insulating shell 10 may be filled with a sealing compound or bushing cement as shown in Fig. 1 if desired.

The apparatus connected with lead terminal 35 may be disconnected from line conductor 58 by pulling on ring portion 79 of cover member 77 thereby completely disconnecting fuse contacts 81 and 83 from contact clips 73 and 75. Upon occurrence of overload or fault conditions, fuse 54 will blow thereby disconnecting lead conductor 35 from line conductor 58. Fuse member 54 may be renewed by opening cover member 77 and removing the same from casing member 71 in a manner well known in the art. The operation of the lightning arrester feature is substantially the same as that described in connection with Figs. 3 and 4.

Figure 7:
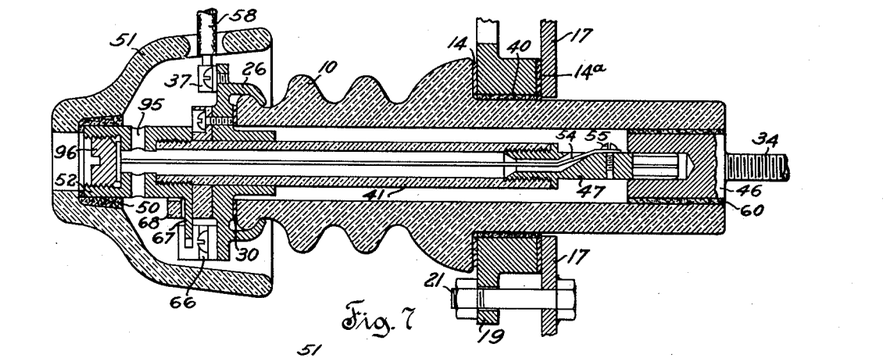
Fig. 7 is a sectional view of a combined insulating bushing, fuse and cut-out switch embodying the invention.

Fig. 7 shows a protective device substantially the same as that shown in Fig. 4 except that the lightning arrester feature is omitted. In Fig. 7 insulating bushing member 10 projects through an aperture in casing or partition member 17 and is attached thereto by any suitable bushing clamps, noting that for the sake of illustration, a clamp ring 19 is shown as attached to member 10 by means of bushing cement 40 with a suitable gasket 14 interposed between the flange portion of member 10 and clamping member 19. A plurality of bolts 21 are preferably welded to member 17 and extend through holes in member 19 spaced circumferentially therearound for the purpose of clamping ring 19 to the partition member 17, between which a suitable gasket 14 may be interposed. A stationary contact member 46 having a lead terminal portion 34 is preferably attached to the inner wall of bushing member 10 by means of bushing cement 60.

A cap member 26 is suitably attached to the left end of bushing member 10 with a gasket 30 interposed therebetween. In Fig. 7 this attachment is accomplished by clamping or rolling an annular portion of cap member 26 into an annular groove in bushing member 10. Cap member 26 carries a line terminal 37 to which line conductor 58 is connected. Cap member 26 is provided with an axial bore which serves as a guide for a fuse tube 41 which is preferably of heat resisting material such as fiber. A plug contact 47 is attached to the right hand end of fuse tube 41 preferably by a screw connection and is provided with a terminal screw 55 on which fuse conductor 54 is adapted to be fastened. Cap member 26 is also provided with a stationary contact member 66 detachably connected thereto. A bushing member 52 is suitably attached to the left hand end of fuse tube 41 and is provided with a movable contact portion 67 adapted to rotate into engagement with stationary contact 66. Contact bushing 52 is also provided with a plurality of vent holes 95 for the passage of gases upon the blowing of fuse 54 and is also provided with a screw plug 96 adapted to clamp the T-shaped head portion of fuse 54. A handle member 51 is suitably attached to member 52 preferably by means of bushing cement 50 and is provided with a bayonet slot (similar to that shown in Fig. 5) adapted to receive line conductor 58. An interlocking member 68 of insulation is suitably attached to cap member 26 and is provided with a bayonet slot adapted to receive contact portion 67. By reason of the bayonet slots in members 51 and 68 the fuse carrier may be inserted in the aperture in cap member 26 and pushed to the right so that contact plug 47 moves into engagement with stationary contact 46 and bushing member 52 moves into abutment with the ring portion of insulating member 68, however, contact 67 cannot engage stationary contact 66 until handle member 51 is rotated in a clockwise direction as viewed from the left. This feature prevents the fuse carrier and handle from being ejected from the axial hole in the bushing member by reason of the explosive force of the gases generated within the fuse tube.

The above described device may be used to interrupt the circuit between the line terminal 37 and lead terminal 34 by turning handle member 51 in a counter-clockwise direction as viewed from the left, thereby disengaging contacts 66 and 67. Upon occurrence of an overload on the apparatus connected with lead terminal 34, fuse 54 will melt thereby producing an arc which will force gases through fuse tube 41, out vent holes 95 and out through the space between the hood portion of handle 51 and bushing insulator 10. The fuse may be renewed by removing the fuse carrier from the bushing assembly, removing screw 55 and screw plug 96, then threading a new fuse link through the fuse tube and through the hole in plug contact 47.

Figure 8:
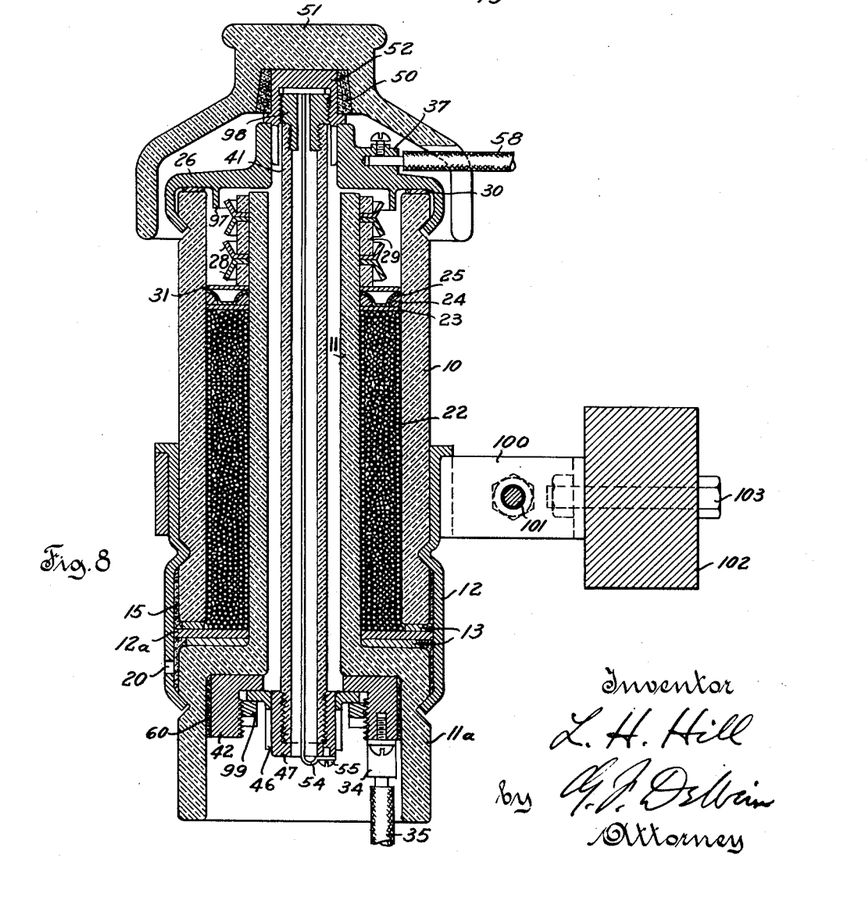
Fig. 8 is a sectional view of a combined lightning arrester, fuse and cut-out switch.

Fig. 8 shows a protective device substantially the same as that shown in Fig. 4 except that the device is adapted to be attached to a cross-arm or other stationary object such as the side wall of a transformer casing and thus does not serve the function of an insulating bushing. In Fig. 8 insulating shell member 10 is shown as having smooth side walls, however, this member may be provided with creepage corrugations such as shown in Figs. 3 or 4 if desired. Insulating tube 11 is held in nesting relation relative to shell member 10 by means of a clamping structure which comprises sleeve member 12 which is adapted to be crimped or rolled into annular grooves formed in members 10 and 11. A ground ring 12a and gaskets 13—13 are interposed between shell member 10 and the radially extending portion 11a of insulating tube 11, noting that sealing compound or bushing cement 15 may be forced through hole 20 into the space between sleeve 12 and insulating members 10 and 11 to seal the joint between members 10 and 11.

Cap member 26 is preferably attached to the upper end of shell member 10 by crimping or rolling an annular edge thereof into an annular groove formed in shell member 10 after gasket 30 has been interposed therebetween. This joint may also be sealed by means of bushing cement or any suitable sealing compound. A collar member 42 is attached to tube member 11 preferably by means of bushing cement 60 and is provided with lead terminal 34 to which lead conductor 35 is attached. Collar member 42 is provided with an interiorly threaded aperture attached to receive stationary contact 46 which is removably held in place by means of clamping ring 99. Stationary contact member 46 is provided with a serrated annular portion forming a plurality of resilient contact fingers which are adapted to engage plug contact 47. Plug contact 47 is suitably attached preferably by a screw connection to fuse tube 41 which may be of fiber or other heat resisting insulating material. The upper end of fuse tube 41 is fixedly attached to a bushing member 98 and is suitably pinned thereto. Bushing member 98 is provided with an exteriorly threaded portion adapted to be screwed into bushing contact member 52 with the head portion of fuse 54 interposed therebetween. Bushing contact 52 is provided with an annular serrated portion forming a plurality of resilient contacts adapted to engage the inner cylindrical walls of cap member 26. Bushing member 52 is attached to handle 51 by any suitable means such as bushing cement 50. Cap member 26 is provided with a line terminal portion 37 adapted to receive line conductor 58, noting that cap member 51 is provided with an axial slot in the hood portion thereof adapted to receive line conductor 58.

A lightning arrester comprising lightning arrester material 22, contact ring 23, packing rings 24, pressure distributing rings 25 and 31, spark gap elements 28 and insulating spacers 29 are all mounted within the annular chamber defined by the insulating tube members 10 and 11. Cap member 26 is provided with a depending annular portion 97 which is radially spaced from the upper spark gap member so as to provide a spark gap which does not change in length as the lightning arrester material 22 expands and contracts upon change of temperature. The device thus far described is adapted to be attached to a crossarm 102 or any other suitable support such as the side wall of a transformer or reactor casing by means of a clamping ring 100 which surrounds sleeve member 12 and is provided with a clamping bolt 101 and one or more mounting bolts 103. Clamping member 100 is connected to ground through the metallic casing or support to which it is attached or by means of the usual ground conductor. The operation of the above described combined lightning arrester and fuse cut-out switch is substantially the same as that described in connection with Figs. 3 and 4. The word "terminal" as used herein is intended to also include any conductor or pig-tail connected to the elements of the protective device and to which connection to other apparatus or conductors may be made by means of splicing, soldering or otherwise.

The various gaskets and packings 13, 14, 14a, 24 and 30 may be formed of lead, cork or other suitable material; and it is to be understood that the apparatus herein described is merely illustrative of the invention and is not to be taken in a limiting sense, changes in details of construction and arrangement of parts being permissible so long as within the spirit of the invention and the scope of the claims which follow.

It is claimed and desired to secure by Letters Patent:

1. A protective device having terminals mounted thereon and comprising an insulating bushing, a lightning arrester carried by said bushing and having one end thereof connected with one of said terminals, and means for connecting and disconnecting said terminals, said means including cooperating movable and stationary switch contacts and a fusible conductor all carried by said bushing.

2. A protective device having line and lead terminals and comprising an insulating bushing, a lightning arrester arranged within said bushing and having one end thereof connected to one of said terminals, a fuse and a fuse carrier supported by said bushing, switch contacts carried by said bushing and by said fuse carrier, and means for causing said switch contacts to connect said fuse in series with said terminals.

3. In combination, an insulating bushing, having a lead terminal mounted on one end thereof, a switch device mounted on the other end of said bushing and having a line terminal, and a lightning arrester mounted within said bushing in connection with said line terminal, said switch device comprising a fuse and a cut-out switch normally connecting said fuse in series with said line terminal and said lead terminal.

4. In combination, an insulating bushing having terminals mounted on said bushing, a lightning arrester disposed within said bushing and comprising a body of conductive material and a plurality of spark gaps serially connected with one of said terminals, a fuse and a fuse carrier removably supported by said bushing, and arranged for connecting and disconnecting said terminals, and interlocking means carried by said fuse carrier and by said bushing for necessitating a rotary movement of said fuse carrier to connect said fuse in series with said terminals.

5. In combination, an insulating bushing having an aperture therethrough and an annular chamber concentric of said aperture, line and lead terminals mounted on the respective ends of said bushing, a supporting member for said bushing, a lightning arrester mounted in said chamber and having one end thereof connected to said line terminal and the other end thereof connected to said supporting member, a fuse and fuse carrier insertable in said aperture, and means necessitating a rotation of said fuse carrier after insertion in said aperture to connect said fuse in series with said terminals.

6. In combination, an insulating bushing having an axial aperture therethrough, line and lead terminals mounted on said bushing adjacent the ends of said aperture, an elongated fuse holder slidable into said hole and having a contact member on one end thereof adapted to engage said lead terminal, and having another contact member on the other end thereof, a fuse connected between said contact members, and switch mechanism comprising a contact portion carried by said another contact member and another contact portion carried by said line terminal, means for locking said fuse holder in said aperture when the contact portions of said switch mechanism are in engagement, and means carried by said fuse holder for indicating that said fuse is in effective condition.

7. In combination, an insulating bushing having an axial aperture therethrough, line and lead terminals mounted on said bushing adjacent the respective ends of said aperture, an annular chamber concentric of said aperture, a lightning arrester mounted within said chamber and having one end thereof connected to one of said terminals, a fuse member, and a removable fuse carrier slidable in said aperture to connect said fuse between said terminals.

8. In combination, an insulating bushing having line and lead terminals at the respective ends thereof and having an annular chamber therein, manually operable switch mechanism carried by said bushing for connecting and disconnecting said line and lead terminals, and a lightning arrester comprising a conductive element and a series of gaps mounted within said annular chamber and electrically connected with said line terminal.

9. In combination, an insulating bushing having an aperture therethrough and having line and lead terminals mounted on said bushing adjacent the respective ends of said aperture, a lightning arrester mounted within said bushing and having one end thereof electrically connected with said line terminal, and switch mechanism for connecting and disconnecting said line and lead terminals, said mechanism comprising a contact adapted to move longitudinally in said aperture into engagement with said lead terminal and comprising a second contact electrically connected with said first mentioned contact and adapted to rotate into engagement with said line terminal only after said first mentioned contact has moved into engagement with said lead terminal.

10. In combination, an insulating bushing comprising a pair of insulating tubes so nested as to define a longitudinal passage and an annular chamber concentric therewith, terminals mounted adjacent the ends of said longitudinal passage, a lightning arrester within said annular chamber and having a spark gap element electrically connected with one of said terminals, and switch mechanism for connecting and disconnecting said terminals comprising a tubular member adapted to slide in said passageway into engagement with one of said terminals and also comprising a hood portion overlying one end of said bushing and constituting an operating handle for said switch mechanism.

11. In combination, an insulating casing comprising concentric tube members forming an annular chamber and a cylindrical chamber, a terminal mounted on each end of said casing, a lightning arrester mounted within said annular chamber, and means comprising a fusible conductor and switch mechanism for connecting and disconnecting said terminals.

12. In combination, a casing comprising nested insulating tube members forming a cylindrical chamber and an annular chamber, means for holding said tube members in nesting relation and constituting a ground terminal and a mounting bracket, a connection terminal mounted adjacent each end of said cylindrical chamber, a lightning arrester mounted within said annular chamber and connected with said ground terminal and one of said connection terminals, and manually operable means including a fusible element for connecting and disconnecting said connection terminals.

13. In combination, nested insulating tubes forming an annular chamber, means for holding said tubes in nesting relation, a lightning arrester mounted within said annular chamber, terminal members mounted adjacent the ends of the inner one of said nested tubes, a removable fuse carrier comprising an insulating handle portion covering one end of said nested tubes and also comprising an elongated portion having contacts adapted to engage said terminals respectively, and a fusible conductor connected between said contacts.

14. In combination, insulating tube members nested together to form an annular chamber, line and lead terminals mounted adjacent the ends of the inner of said nested tube member, means for electrically connecting said line and lead terminals, a conductive shield member surrounding a portion of the outer of said nested tube members, a lightning arrester mounted within said annular chamber, and means for serially connecting said lightning arrester between one of said terminals and said conductive shield member.

15. In combination, an insulating shell member, an insulating tube member nested within said shell member and having an enlarged portion in abutting alignment with said shell member, a conductive shield member arranged around the abutting portions of said insulating members to hold the same in nesting relation and having means for attaching said insulating members to a support, and a lightning arrester mounted within said shell member and surrounding said insulating tube.

16. In combination, a casing of electrically conductive material having an aperture therein, an insulating bushing having an aperture forming a chamber, a member of electrically conductive material affixed to said bushing and detachably supporting the same in the first said aperture, a line conductor detachably supported on said bushing, an apparatus lead conductor extending through said first said aperture into said chamber and detachably connected with said line conductor, surge diverting means disposed within said chamber and connected between said casing and said conductors, and means sealing the interior of said casing from said surge diverting means.

17. In combination, a casing of electrically conductive material having an aperture therein, an insulating bushing having an aperture forming a chamber, a member of electrically conductive material conductively connected to said casing and affixed to said bushing and detachably supporting said bushing in the first said aperture, a line conductor detachably supported on said bushing, an apparatus lead conductor extending through said first said aperture into said chamber and detachably connected with said line conductor, surge diverting means disposed within said chamber and connected between said member and said conductors, and means sealing the interior of said casing from said surge diverting means.

18. In combination, an insulating shell member, an insulating tube member nested within said shell member, resistance material between said members, a conductive member, means yieldingly positioning said resistance material in electrical connection with said conductive member, a conductor in said tube member, and means providing a spark gap surge current path from said conductor through said resistance material and said conductive member.

19. In combination, a casing containing electrical apparatus, an aperture in said casing, means for detachably supporting a bushing and lightning arrester assembly in said aperture, said assembly comprising an insulating shell member, an insulating tube member nested within said shell member, resistance material between said members, a conductive member, means yieldingly positioning said resistance material in electrical connection with said conductive member, a conductor in said tube member and connected to said electrical apparatus, and means providing a spark gap surge current path from said conductor through said resistance material and said conductive member.

20. In combination, an insulating bushing provided with a chamber therein, a member of electrically conductive material substantially closing one end of said chamber, a line conductor detachably supported on said bushing, an apparatus lead conductor extending into said chamber and detachably connected with said line conductor, an insulating tube surrounding said apparatus lead conductor, and surge diverting means comprising resistance material disposed within said chamber surrounding said insulating tube and in electrical connection with said line conductor and said member of electrically conductive material.

21. In combination, a casing containing electrical apparatus, an aperture in said casing, means for detachably supporting a bushing and lightning arrester assembly in said aperture, said assembly comprising an insulating bushing provided with a chamber therein, a member of electrically conductive material substantially closing one end of said chamber, a line conductor detachably supported on said assembly, a lead conductor extending into said chamber and detachably connecting said line conductor and said apparatus, an insulating tube surrounding said lead conductor, and surge diverting means comprising resistance material disposed within said chamber surrounding said insulating tube and in electrical connection with said line conductor and said member of electrically conductive material.

22. A bushing and lightning arrester assembly comprising an insulating shell member, an insulating tube member nested within said shell member, resistance material between said members, a line terminal on said assembly, a spark gap connection between said line terminal and said resistance material, and an electrically conductive member connected to said line terminal and extending through said tube member.

23. A protective device having terminals mounted thereon and comprising an insulating bushing, means carried by said bushing for by-passing excessive electrical charges from one of said terminals to ground, and a current overload protecting device mounted on said bushing in operative relationship with said terminals.

24. An accessory for transformers and the like, comprising a body part of insulating material adapted to be mounted on the exterior of the metal casing of a transformer or similar apparatus and constructed so as to function as an insulator for a lead of the transformer winding, a transformer lead terminal and a line-lead terminal mounted on said body part in spaced relationship, a current cut-out device on said body part provided with an element that bridges across said terminals, and a lightning arrester housed in said body part for shunting to earth any superimposed high or excessive voltages on the supply line to which the apparatus is connected.

25. An accessory for transformers and the like, comprising a body part of insulating material adapted to be mounted on the exterior of the metal casing of a transformer and provided with a portion positioned in an opening in said casing, a transformer lead terminal and a line-lead terminal mounted on said body part in spaced relationship, a current overload protecting device on said body part that cooperates with said terminals to prevent injury to the electrical windings of the transformer, and a lightning arrester on said body part that protects the transformer insulation against breakdown by high superimposed voltages.

26. An accessory for transformers and the like, comprising a body part of insulating material adapted to be mounted on the exterior of the metal casing of a transformer and provided with a portion positioned in an opening in said casing, a transformer lead terminal and a line-lead terminal mounted on said body part in spaced relationship, a current overload protecting device on said body part that cooperates with said terminals to prevent injury to the electrical windings of the transformer, and means carried by said body part for by-passing excessive electrical charges from said line-lead terminal to the ground.

LELAND H. HILL.